United States Patent
Couvrand et al.

(10) Patent No.: US 12,058,255 B2
(45) Date of Patent: Aug. 6, 2024

(54) ELECTRONIC SYSTEM COMPRISING A PLURALITY OF MICROPROCESSORS

(71) Applicants: STMicroelectronics (Rousset) SAS, Rousset (FR); STMicroelectronics (Grand Ouest) SAS, Le Mans (FR)

(72) Inventors: Julien Couvrand, Le Mans (FR); William Orlando, Peynier (FR)

(73) Assignees: STMicroelectro cs (Rousset) SAS, Rousset (FR); STMicroelectronics (Grand Ouest) SAS, Le Mans (FR)

( * ) Notice: Subject to any disclaimer, the term of this patent is extended or adjusted under 35 U.S.C. 154(b) by 306 days.

(21) Appl. No.: 17/553,481

(22) Filed: Dec. 16, 2021

(65) Prior Publication Data
US 2022/0209947 A1    Jun. 30, 2022

(30) Foreign Application Priority Data
Dec. 28, 2020 (FR) .................................. 2014176

(51) Int. Cl.
*H04L 9/08* (2006.01)
(52) U.S. Cl.
CPC .................. *H04L 9/0894* (2013.01)
(58) Field of Classification Search
None
See application file for complete search history.

(56) References Cited

U.S. PATENT DOCUMENTS

| | | | |
|---|---|---|---|
| 10,749,680 B1 * | 8/2020 | Troia | B60R 25/24 |
| 10,754,960 B2 * | 8/2020 | Chhabra | G06F 21/31 |
| 10,872,152 B1 * | 12/2020 | Martel | G06F 21/31 |
| 2009/0034734 A1 * | 2/2009 | Owens | G06F 21/74  380/277 |
| 2010/0290624 A1 | 11/2010 | Buer et al. | |
| 2019/0334882 A1 | 10/2019 | Mondello et al. | |
| 2021/0365204 A1 * | 11/2021 | Trout | G06F 3/0688 |

FOREIGN PATENT DOCUMENTS

| | | | | |
|---|---|---|---|---|
| CN | 101615233 A | * | 12/2009 | ............ G06F 12/14 |
| EP | 3 425 552 B1 | | 9/2020 | |
| WO | WO-2011001685 A1 | * | 1/2011 | .......... G06F 21/575 |
| WO | WO-2017160385 A1 | * | 9/2017 | .......... G06F 8/4441 |

* cited by examiner

*Primary Examiner* — Benjamin E Lanier
(74) *Attorney, Agent, or Firm* — Seed IP Law Group LLP (57) ABSTRACT

The present description concerns an electronic system including one or a plurality of first microprocessors, a second microprocessor for securely managing first encryption keys of the first microprocessors, the second microprocessor being configured to communicate with each first microprocessor and including a first non-volatile memory having at least one second key stored therein, and for each first microprocessor, a second non-volatile memory external to the second microprocessor and containing the first keys of the first microprocessor encrypted with the second key.

16 Claims, 3 Drawing Sheets

ELECTRONIC SYSTEM COMPRISING A PLURALITY OF MICROPROCESSORS

CROSS-REFERENCE TO RELATED APPLICATION(S)

This application claims the priority benefit of French patent application number 20/14176, filed on Dec. 28, 2020, entitled "Système électronique comprenant plusieurs microprocesseurs", which is hereby incorporated by reference to the maximum extent allowable by law.

BACKGROUND

Technical Field

The present disclosure generally concerns electronic systems, and more particularly electronic systems comprising a plurality of microprocessors.

Description of the Related Art

Electronic systems comprising a plurality of microprocessors are known. Among such systems, the case of systems comprising at least one microprocessor behaving, for the other microprocessors of the system, as a black box, are more particularly considered herein. Such a microprocessor, called secure microprocessor, implements a set of functions or services, generally critical for the system security, for example, cipher/decipher services, also called encryption services. This set of services is made available to the other microprocessors of the system, also called host microprocessors.

For the cipher/decipher operations, the secure microprocessor uses cipher/decipher keys, called host keys, which generally depend on the host microprocessors requiring the services of the secure microprocessor. These host keys should be stored in a non-volatile memory. It may be desirable to be able to modify the host keys during the operation of the electronic system. The keys must thus be stored in an erasable and programmable non-volatile memory. However, it is possible for the microprocessor to comprise no erasable and programmable non-volatile memory. The host keys should then be stored in an erasable and programmable non-volatile memory external to the secure microprocessor. It may then be difficult to ensure a secure management of the host keys.

BRIEF SUMMARY

An embodiment overcomes all or part of the disadvantages of known electronic systems comprising a plurality of microprocessors.

An embodiment provides an electronic system comprising:
one or a plurality of first microprocessors;
a second microprocessor for securely managing first encryption keys of the first microprocessors, the second microprocessor being configured to communicate with each first microprocessor and comprising a first non-volatile memory having at least one second key stored therein; and
for each first microprocessor, a second non-volatile memory external to the second microprocessor and containing the first keys of the first microprocessor encrypted with the second key.

An embodiment also provides an operating method of an electronic system comprising:

one or a plurality of first microprocessors;
a second microprocessor for securely managing first encryption keys of the first microprocessors, the second microprocessor communicating with each first microprocessor and comprising a first non-volatile memory having at least one second key stored therein; and
for each first microprocessor, a second non-volatile memory external to the second microprocessor and containing the first keys of the first microprocessor encrypted with the second key.

According to an embodiment, for each first microprocessor, the second microprocessor is coupled to the second non-volatile memory associated with the first microprocessor only via the first microprocessor.

According to an embodiment, for each first microprocessor, the second non-volatile memory associated with the first microprocessor contains a table indexing the first keys of the first microprocessor and having a portion encrypted with the second key or with another second key stored in the first non-volatile memory.

According to an embodiment, the second microprocessor contains a volatile memory and, for each first microprocessor, the second microprocessor is configured to ask the first microprocessor to transmit thereto the table stored in the second non-volatile memory associated with the first microprocessor to, on reception of the table, decrypt the encrypted portion of the table by using the second key or said other second key, and to store the decrypted portion of the table into the volatile memory.

According to an embodiment, for each first microprocessor, the table stored in the second non-volatile memory associated with the first microprocessor contains a monotonic counter.

According to an embodiment, the second microprocessor is configured, for each first microprocessor, to ask the first microprocessor to transmit thereto the value of the monotonic counter of the table present in the second non-volatile memory associated with the first microprocessor, and to verify the validity of the transmitted value of the monotonic counter.

According to an embodiment, the second microprocessor is configured to ask the first microprocessor to transmit thereto the first encrypted keys stored in the second non-volatile memory associated with the first microprocessor and to decrypt the first transmitted keys.

According to an embodiment, the second microprocessor is configured to determine, for each first transmitted key, whether the first key can be stored into the volatile memory and, if so, to store the first decrypted key into the volatile memory.

According to an embodiment, for each first microprocessor, the second microprocessor is configured to update the table and one of the first keys of the first microprocessor, to encrypt the portion of the table and the first key by using the second key or said other second key, and to control the first microprocessor so that it stores into the second non-volatile memory associated with the first microprocessor the updated table and the updated first key.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail. Unless specified otherwise, the expressions "around," "approximately," "substantially" and "in the order of" signify within 10%, and preferably within 5%.

Figure 1:
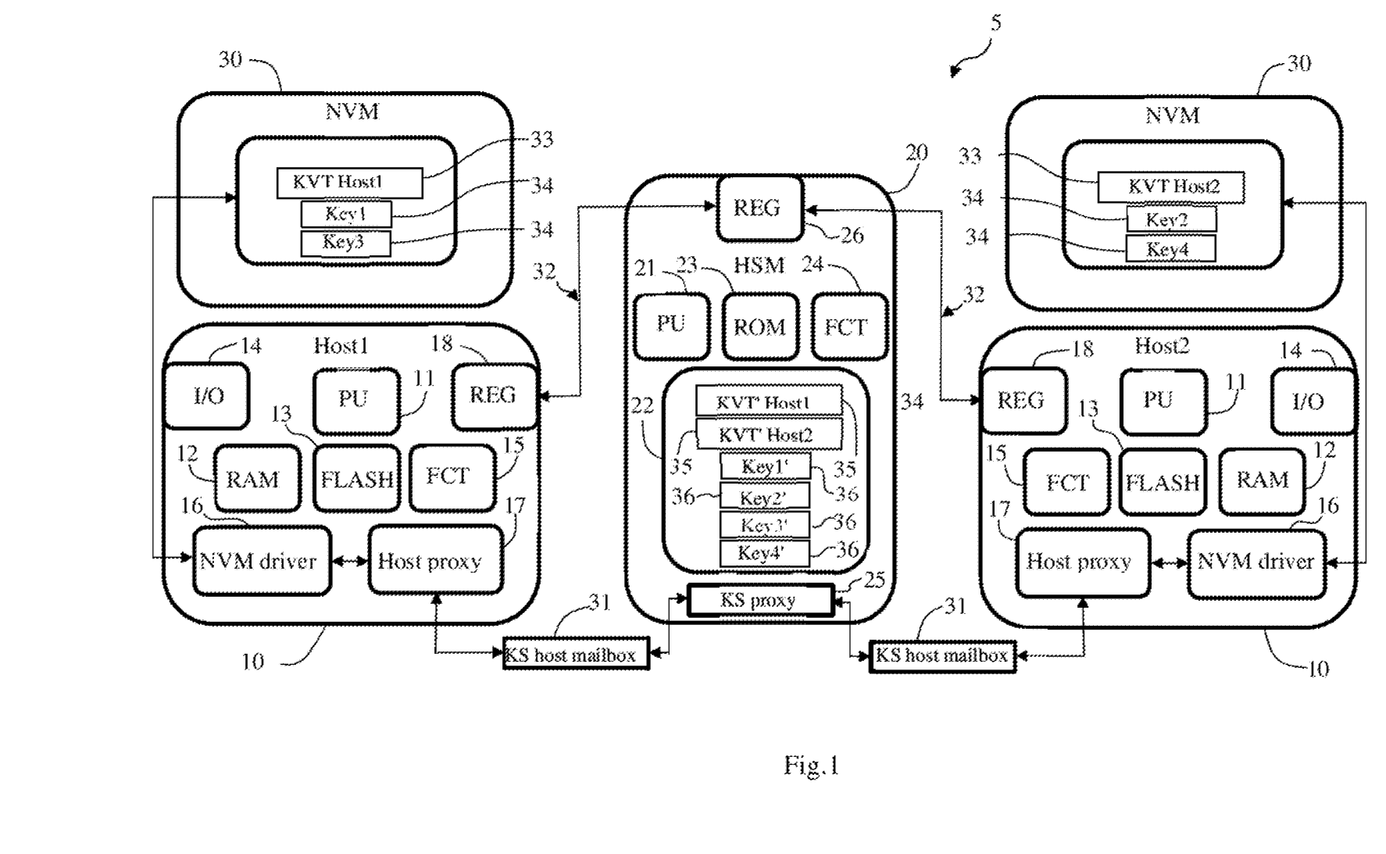
FIG. 1 shows an embodiment of an electronic system comprising a plurality of microprocessors, including a secure microprocessor.

FIG. 1 partially and schematically shows an electronic system 5. As an example, the electronic system may correspond to the onboard network of a motor vehicle.

Electronic system 5 comprises a plurality of microprocessors, first and second microprocessors 10 (Host1 and Host2) and a third microprocessor 20 (HSM) being shown in this example. Microprocessor 20 behaves as a black box. In other words, microprocessor 20 makes a set of services or of functions available to the other microprocessors 10 of the system, called host microprocessors hereafter, without for the latter to be able to access the content of microprocessor 20. More particularly, the host microprocessors 10 of system 5 cannot access the software codes or the hardware implementing the services displayed by microprocessor 20, nor can they access the data used and/or generated internally to microprocessor 20 for the implementation of the services.

In this embodiment, microprocessor 20 is a secure microprocessor or, in other words, a hardware secure module (HSM).

The term microprocessor here means an electronic device comprising, in a same integrated circuit, a central processing unit and at least one non-volatile memory storing instructions, which, when they are read by the central unit, cause the implementation of functions.

More particularly, in this example, each host microprocessor 10 comprises:
- a processing unit 11 (PU), for example, a state machine, a programmable logic circuit, etc.;
- one or a plurality of volatile memory areas 12, for example of RAM type, for example to temporarily store information (instructions, addresses, data) during the processings;
- one or a plurality of non-volatile memory areas, for example a flash-type memory 13 (FLASH) for durably storing information, in particular when host microprocessor 10 is not powered;
- one or a plurality of data, address, and/or control buses (not shown) between the different elements internal to host microprocessor 10; and
- an input-output interface 14 (I/O), for example, of serial bus type, of communication with the outside of host microprocessor 10, for example, to program functions and/or record data into host microprocessor 10.

Further, host microprocessor 10 may integrate other functions, symbolized by a block 15 (FCT), according to the application, for example, a coprocessor, other interfaces, other memories, etc.

In this example, secure microprocessor 20 comprises:
- a processing unit 21 (PU), for example, a state machine, a programmable logic circuit, etc.;
- one or a plurality of volatile memory areas 22, for example, a RAM-type memory 22, for example to temporarily store information (instructions, addresses, data) during the processings;
- one or a plurality of non-volatile memory areas 23, for example, a ROM-type memory 23, to durably store information, in particular when secure microprocessor 20 is not powered; and
- one or a plurality of data, address, and/or control buses (not shown) between the different elements internal to secure microprocessor 20.

Further, secure microprocessor 20 generally integrates other functions, symbolized by a block 24 (FCT), according to the application, for example, a crypto-processor, other interfaces, other memories, etc. Preferably, microprocessor 20 integrates at least one encryption circuit, or crypto-processor, to cipher/decipher data, for example, according to an AES GCM algorithm, an AES CBC algorithm, or an RSA algorithm.

Each host microprocessor 10 has an associated non-volatile memory 30 (NVM). Each non-volatile memory 30 for example corresponds to an electrically-erasable programmable read-only memory (EEPROM), particularly a flash memory, in particular a NOR flash memory, a NAND flash memory, or also an EMMC flash memory. Non-volatile memory 30 may correspond to an internal element of host microprocessor 10, for example, the previously-described non-volatile memory 13, or may be a component distinct from host microprocessor 10.

Each host microprocessor 10 comprises a module 16 (NVM driver) for controlling non-volatile memory 30 configured to exchange data with non-volatile memory 30 and with an interface module 17 (Host proxy).

Secure microprocessor 20 may exchange data with each host microprocessor 10 over a communication channel 31 (KS host mailbox). The interface module 17 of host microprocessor 10 is coupled to communication channel 31. Secure microprocessor 20 comprises an interface module 25 (KS proxy) for the data exchange over each communication channel 31.

So that secure microprocessor 20 can display services to host microprocessor 10, and so that host microprocessor 10 can require access to one of these services, microprocessors 10 and 20 share a secure interface 32.

Interface 32 for example comprises a memory or storage space 26 (REG) forming part of secure microprocessor 20, and a memory or storage space 18 (REG) forming part of host microprocessor 10. Storages spaces 18 and 26 are preferably registers. When host microprocessor 10 desires accessing a service displayed by secure microprocessor 20, it indicates this by a request, by modifying one or a plurality of bits of register 26. Secure microprocessor 20 detects the request and reads from a specific memory area, for example, predetermined, of the memory space of host microprocessor 10, for example, of memory 12, having a request descriptor recorded therein. A request descriptor corresponds in practice to data indicating to which service of secure microprocessor 20 host microprocessor 10 desires accessing and, possibly, the parameters determining how the called service should be implemented.

Secure microprocessor 20 may in particular be used by each host microprocessor 10 to perform operations using encryption keys, called host keys hereafter. Each host key is dedicated to one of host microprocessors 10. A plurality of host keys may be associated with each host microprocessor 10. The host keys may be dedicated to encryption/decryption operations according to different algorithms. As an example, the host keys may be used by a symmetrical cipher algorithm, particularly, the AES algorithm (Advanced Encryption Standard), in particular AES-128 or AES-256, an asymmetrical cipher algorithm, particularly, RSA, ECC ciphering, or for the forming of a message authentication code of HMAC (keyed-hash message authentication code) type.

At least one encryption key, called SSK-PSE key, which is specific to security circuit 20, is stored in the non-volatile memory 23 of secure microprocessor 20. Preferably, at least two encryption keys, called SSK-KVT key and SSK-PSE key, which are specific to security circuit 20, are stored in the non-volatile memory 23 of secure microprocessor 20.

According to an embodiment, the management of the encryption keys by secure microprocessor 20 implements two objects. The first object is a key version table, called KVT hereafter. There is one KVT for each host microprocessor 10 containing information relative to the host keys of this host microprocessor 10. The second object is a protected storage element, called PSE hereafter. Each PSE comprises data relative to a host key.

For each microprocessor 10, the KVT of this host microprocessor 10 is stored in the non-volatile memory 30 associated with this host microprocessor 10. FIG. 1 schematically shows with rectangles 33 the KVT (KVT Host1) stored in the non-volatile memory 30 associated with the first host microprocessor 10 and the KVT (KVT Host2) stored in the non-volatile memory 30 associated with the second host microprocessor 10. Further, for each microprocessor 10, the PSEs of the host keys of this host microprocessor 10 are stored in the non-volatile memory 30 associated with this host microprocessor 10. FIG. 1 schematically shows with rectangles 34 the PSEs of two host keys (Key1, Key3) stored in the non-volatile memory 30 associated with the first host microprocessor 10 and the PSEs of two host keys (Key2, Key4) stored in the non-volatile memory of the second host microprocessor 10.

According to an embodiment, in normal operation, for each host microprocessor 10, the KVT associated with the host microprocessor 10 is stored in the volatile memory 22 of secure microprocessor 20. FIG. 1 schematically shows with rectangles 35 the KVT (KVT' Host1) of the first host microprocessor 10 and the KVT (KVT' Host2) of the second host microprocessor 10 stored in the volatile memory 22 of secure microprocessor 20.

According to this embodiment, in normal operation, for each host microprocessor 10, the PSE of each host key associated with each host microprocessor 10 may also be stored in the volatile memory 22 of secure microprocessor 20. FIG. 1 schematically shows with rectangles 36 the PSEs (Key1', Key3') of the first host microprocessor 10 and the PSEs (Key2', Key4') of the second host microprocessor 10 stored in the volatile memory 22 of secure microprocessor 20.

Table 1 hereafter shows an example of data that may be contained in a KVT stored in non-volatile memory 30, knowing that the KVT may comprise additional data

TABLE 1

| Section | Description | |
|---|---|---|
| Header | KVT identifier | |
| | Anti-rollback protection monotonic counter (mc) | |
| Tag | KVT integrity tag | |
| Payload | Maximum number of AES-128 keys | |
| | Maximum number of AES-256 keys | |
| | Maximum number of RSA keys | |
| | Maximum number of ECC keys | |
| | Maximum number of HMAC keys | |
| | Total maximum number of keys | |
| | Number of inputs | |
| | Table of the keys present | |
| | Table of the storable keys | |
| | Input 1 | mc |
| | Input 2 | mc |
| | ... | |
| | Input 127 | mc |
| | Input 128 | mc |

The data relative to the header of the KVT are data which are not encrypted. The data relative to the payload of the KVT are data encrypted by using the SSK-KVT key of secure microprocessor 20. The integrity tag of the KVT is a number determined by a calculation based on the header of the KVT and at least a portion of the encrypted payload of the KVT.

The monotonic counter (mc) based on a non-volatile memory keeps a count or a value that can only be updated by an appropriate number or quantity in one direction. In other words, the monotonic counter can only increment its value by an appropriate number or decrement its value by an appropriate number, but not both.

Table 2 hereafter shows an example of data that may be contained in a PSE, knowing that the PSE may comprise additional data.

TABLE 2

| Section | Description |
|---|---|
| Header | PSE identifier |
| | Anti-rollback protection monotonic counter (mc) |
| | Size of the payload of the PSE |
| Tag | Integrity tag of the PSE |
| Payload | Key identifier |
| | Key type |
| | Key size |
| | Key data |

The data relative to the header of the PSE are data which are not encrypted. The data relative to the payload of the PSE are data encrypted by using the SSK-PSE key of secure microprocessor 20. The integrity tag of the PSE is a number determined by a calculation based on the header of the PSE and at least a portion of the encrypted payload of the PSE.

Figure 2:
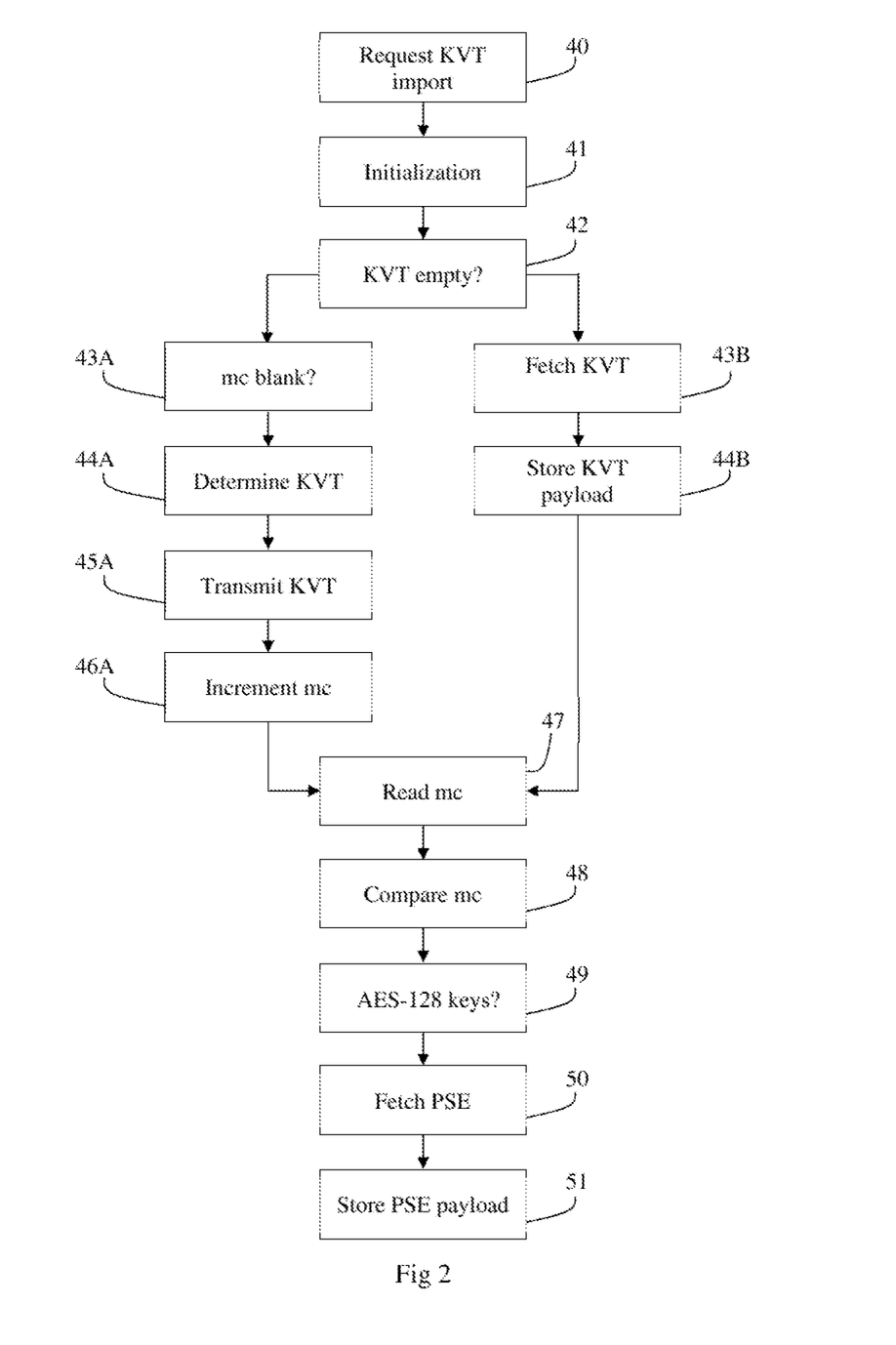
FIG. 2 shows, in a block diagram, an embodiment of a method of management of host keys of the electronic system of FIG. 1.

FIG. 2 illustrates, in a block diagram, an embodiment of a method of loading by secure microprocessor 20 of the KVT and of the PSEs of a host microprocessor 10.

At step 40, host microprocessor 10 sends secure microprocessor 20 a request, over secure interface 32, for the importation by secure microprocessor 20 of the KVT and of the PSEs of host microprocessor 10. The method carries on at step 41.

At step 41, secure microprocessor 20 carries out initialization steps prior to the loading of the KVT and of the PSEs. These steps comprise the initialization of the monotonic counter (that is, the creation of a monotonic counter stored either in non-volatile memory 30 or in the internal volatile memory 22 of secure microprocessor 20), a step of initialization of the SSK-PSE and SSK-KVT keys, and a step of synchronization with the non-volatile memory 30 associated with the host microprocessor 10 having transmitted the request at step 40 via interface module 17 and module 16 for controlling non-volatile memory 30. The method carries on at step 42.

At step 42, host microprocessor 10 transmits to secure microprocessor 20 first data relative to the KVT stored in memory 30. Secure microprocessor 20 determines from these data whether the KVT is empty. If secure microprocessor 20 determines that the KVT is empty, the method carries on at step 43A. If secure microprocessor 20 determines that the KVT is not empty, the method carries on at step 43B.

At step 43A, secure microprocessor 20 verifies that the value of the monotonic counter of the KVT is blank. Secure microprocessor 20 generates the payload of the KVT, which is stored in the volatile memory 22 of secure microprocessor 20, and increments the value of the monotonic counter. The method carries on at step 44A.

At step 44A, secure microprocessor 20 determines the KVT to be stored in non-volatile memory 30, that is, it encrypts the payload, generates the header of the KVT, and the integrity tag of the KVT. The encryption operation is performed by using the SSK-KVT key. The method carries on at step 45A.

At step 45A, secure microprocessor 20 transmits the KVT to host microprocessor 10 so that host microprocessor 10 performs the storage of the KVT into non-volatile memory 30. The method carries on at step 46A.

At step 46A, secure microprocessor 20 increments the monotonic counter, previously initialized at step 41. In case of a failure of the operation, secure microprocessor 20 interrupts the method and transmits an error message. The method carries on at step 47.

At step 43B, host microprocessor 10 fetches from non-volatile memory 30 the last version of the KVT delivered by secure microprocessor 20 and transmits it to secure microprocessor 20. Secure microprocessor 20 stores the KVT fetched from volatile memory 22. The method carries on at step 44B.

At step 44B, secure microprocessor 20 decrypts the payload of the KVT and authenticates the decrypted KVT. Secure microprocessor 20 then stores the payload of the decrypted KVT into volatile memory 22. The method carries on at step 47.

At step 47, secure microprocessor 20 controls the reading of the current value of the monotonic counter present either in the non-volatile memory 30 or in the internal volatile memory 22 of secure microprocessor 20. The method carries on at step 48.

At step 48, secure microprocessor 20 compares the current value of the monotonic counter read at step 47 with that expected in the KVT. In case of an inequality, secure microprocessor 20 interrupts the method and transmits an error message. The method carries on at step 49.

At step 49, secure microprocessor 20 determines, from the KVT, whether host keys for an AES-128 algorithm are present and whether they may be stored into volatile memory 22. The method carries on at step 50.

At step 50, host microprocessor 10 fetches from non-volatile memory 30 the PSE of each AES-128 key and transmits it to secure microprocessor 20. Secure microprocessor 20 stores the fetched PSE into volatile memory 22. The method carries on at step 51.

At step 51, secure microprocessor 20 decrypts the payload of the fetched PSE and authenticates the decrypted PSE. Secure microprocessor 20 then stores the payload of the decrypted PSE into volatile memory 22.

Steps 49, 50, and 51 are repeated for the host keys for a RSA, ECC, AES-256, and HMAC algorithm.

The reading of the KVT and of the PSEs from non-volatile memory 30 is performed by host microprocessor 10 and not by secure microprocessor 20. This enables to benefit from the read/write power of host microprocessor 10, which may be greater than that of secure microprocessor 20. Further, since the host keys are not stored in the non-volatile memory 23 of secure microprocessor 20, the number of host keys used by secure microprocessor 20 is not limited by the dimensions of non-volatile memory 23. Further the payloads of the KVT and of the PSEs being encrypted, these data are stored in secure fashion. This advantageously enables to do away with the use of a specific memory with a secure access for secure microprocessor 20. Further, the monotonic counter may correspond to the monotonic counter already available for certain non-volatile memories, particularly the RPMC (Replay-Protected Monotonic Counter) counter for a NOR-type flash memory or the RPMB (Replay Protected Memory Block) block for a flash memory of eMMC (embedded Multi-Media Controller) type.

Figure 3:
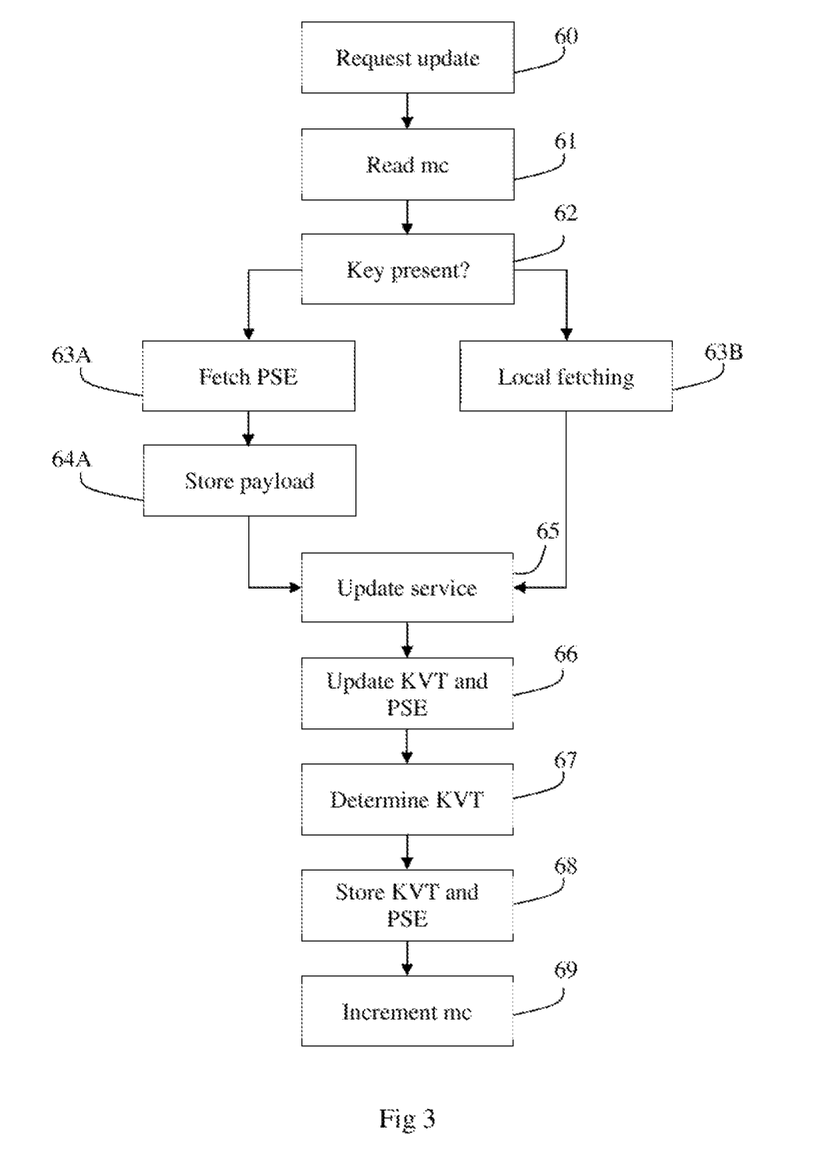
FIG. 3 shows, in a block diagram, another embodiment of a method of update of host keys of the electronic system of FIG. 1.

FIG. 3 illustrates, in a block diagram, an embodiment of a method of update by the secure microprocessor 20 of a host key.

At step 60, host microprocessor 10 sends a request to secure microprocessor 20, over secure interface 32, for a host key update. The method carries on at step 61.

At step 61, secure microprocessor 20 controls the reading of the current value of the monotonic counter present in the non-volatile memory 30 or in the internal volatile memory 22 of secure microprocessor 20. The method carries on at step 62.

At step 62, secure microprocessor 20 determines whether the host key is already present in volatile memory 22. If secure microprocessor 20 determines that the host key is not present in volatile memory 22, the method carries on at step 63A. If microprocessor 20 determines that the host key is already present in volatile memory 22, the method carries on at step 63B.

At step 63A, host microprocessor 10 fetches from non-volatile memory 30 the PSE of the key if this key can be stored into volatile memory 22. If the PSE is not present in non-volatile memory 30, secure microprocessor 20 interrupts the process and transmits an error message. Secure microprocessor 20 stores the fetched PSE into volatile memory 22. The method carries on at step 64A.

At step 64A, secure microprocessor 20 decrypts the payload of the PSE and authenticates the decrypted PSE. Secure microprocessor 20 then stores the payload of the decrypted PSE into volatile memory 22. The method carries on at step 65.

At step 63B, secure microprocessor 20 fetches the data that it needs relating to the host key from volatile memory 22. The method carries on at step 65.

At step 65, secure microprocessor 20 asks host microprocessor 10 for the new key by using the service of key loading over secure interface 32. The method carries on at step 66.

At step 66, secure microprocessor 20 updates the KVT of host microprocessor 10 and the PSE of the host key. In particular, secure microprocessor 20 increments the value of the monotonic counter of the KVT (present in the header). The method carries on at step 67.

At step 67, secure microprocessor 20 determines the KVT to be stored into non-volatile memory 30, that is, it encrypts the payload of the KVT, generates the header of the KVT, and the integrity tag of the KVT. The encryption operation is performed by using the SSK-KVT key. The method carries on at step 68.

At step 68, secure microprocessor 20 transmits the KVT to host microprocessor 10 so that host microprocessor 10 performs the storage of the KVT into non-volatile memory 30. The method carries on at step 69.

At step 69, secure microprocessor 20 increments the monotonic counter stored in the non-volatile memory 30 or in the internal volatile memory 22 of secure microprocessor 20. In case of a failure of the operation, secure microprocessor 20 interrupts the process and transmits an error message.

Secure microprocessor 20 can store in its volatile memory 22 the host keys for which this storage is authorized. This advantageously enables to accelerate the access to these host keys.

Various embodiments and variants have been described. Those skilled in the art will understand that certain features of these various embodiments and variants may be combined, and other variants will occur to those skilled in the art. Finally, the practical implementation of the described embodiments and variations is within the abilities of those skilled in the art based on the functional indications given hereabove.

An electronic system (5) may be summarized as including one or a plurality of first microprocessors (10); a second microprocessor (20) for securely managing first encryption keys of the first microprocessors, the second microprocessor being configured to communicate with each first microprocessor and comprising a first non-volatile memory (23) having at least one second key stored therein; and for each first microprocessor, a second non-volatile memory (30) external to the second microprocessor and containing the first keys of the first microprocessor encrypted with the second key.

An operating method of an electronic system (5) may be summarized as including one or a plurality of first microprocessors (10); a second microprocessor (20) for securely managing first encryption keys of the first microprocessors, the second microprocessor communicating with each first microprocessor and comprising a first non-volatile memory (23) having at least one second key stored therein; and for each first microprocessor, a second non-volatile memory (30) external to the second microprocessor and containing the first keys of the first microprocessor encrypted with the second key.

For each first microprocessor (10), the second microprocessor (20) may be coupled to the second non-volatile memory (30) associated with the first microprocessor only via the first microprocessor.

For each first microprocessor (10), the second non-volatile memory (30) associated with the first microprocessor may contain a table indexing the first keys of the first microprocessor and may have a portion encrypted with the second key or with another second key stored in the first non-volatile memory (23).

The second microprocessor (20) may contain a volatile memory (22) and wherein, for each first microprocessor (10), the second microprocessor may be configured to ask the first microprocessor to transmit thereto the table stored in the second non-volatile memory (30) associated with the first microprocessor to, on reception of the table, decrypt the encrypted portion of the table by using the second key or said other second key, and to store the decrypted portion of the table into the volatile memory (22).

For each first microprocessor (10), the table stored in the second non-volatile memory (30) associated with the first microprocessor may contain a monotonic counter.

The second microprocessor (20) may be configured, for each first microprocessor (10), to ask the first microprocessor to transmit thereto the value of the monotonic counter of the table present in the second non-volatile memory (30) associated with the first microprocessor, and to verify the validity of the transmitted value of the monotonic counter.

For each first microprocessor (10), the second microprocessor (20) may be configured to ask the first microprocessor (10) to transmit thereto the first encrypted keys stored in the second non-volatile memory (30) associated with the first microprocessor and to decrypt the first transmitted keys.

The second microprocessor (20) may be configured to determine, for each first transmitted key, whether the first key can be stored into the volatile memory (22) and, if so, to store the first decrypted key into the volatile memory.

For each first microprocessor (10), the second microprocessor (20) may be configured to update the table and one of the first keys of the first microprocessor, to encrypt the portion of the table and the first key by using the second key or said other second key, and to control the first microprocessor so that it stores into the second non-volatile memory (30) associated with the first microprocessor the updated table and the updated first key.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic system, comprising:
   one or a plurality of first microprocessors;
   a second microprocessor for securely managing first encryption keys of the first microprocessors, the second microprocessor being configured to communicate with each first microprocessor and including a first non-volatile memory having at least one second key stored therein; and
   for each first microprocessor, a second non-volatile memory external to the second microprocessor and containing the first keys of the first microprocessor encrypted with the second key, wherein:
     for each first microprocessor, the second non-volatile memory associated with the first microprocessor contains a table indexing the first keys of the first microprocessor and having a portion encrypted with the second key or with another second key stored in the first non-volatile memory;
     the second microprocessor contains a volatile memory; and
     for each first microprocessor, the second microprocessor is configured to ask the first microprocessor to transmit thereto the table stored in the second non-volatile memory associated with the first microprocessor to, on reception of the table, decrypt the encrypted portion of the table by using the second key or said another second key, and to store the decrypted portion of the table into the volatile memory.

2. The electronic system according to claim 1, wherein, for each first microprocessor, the second microprocessor is coupled to the second non-volatile memory associated with the first microprocessor only via the first microprocessor.

3. The electronic system according to claim 1, wherein, for each first microprocessor, the table stored in the second non-volatile memory associated with the first microprocessor contains a monotonic counter.

4. The electronic system according to claim 3, wherein the second microprocessor is configured, for each first microprocessor, to ask the first microprocessor to transmit thereto the value of the monotonic counter of the table present in the second non-volatile memory associated with the first microprocessor, and to verify the validity of the transmitted value of the monotonic counter.

5. The electronic system according to claim 1, wherein for each first microprocessor, the second microprocessor is configured to ask the first microprocessor to transmit thereto the first encrypted keys stored in the second non-volatile memory associated with the first microprocessor and to decrypt the first transmitted keys.

6. The electronic system according to claim 5, wherein the second microprocessor is configured to determine, for each first transmitted key, whether the first key can be stored into the volatile memory and, if so, to store the first decrypted key into the volatile memory.

7. The electronic system or method according to claim 1, wherein, for each first microprocessor, the second microprocessor is configured to update the table and one of the first keys of the first microprocessor, to encrypt the portion of the table and the first key by using the second key or said another second key, and to control the first microprocessor so that it stores into the second non-volatile memory associated with the first microprocessor the updated table and the updated first key.

8. An operating method of an electronic system having one or a plurality of first microprocessors and a second microprocessor, the method comprising:
securely managing, by the first microprocessor, first encryption keys of the first microprocessors, the second microprocessor communicating with each first microprocessor and including a first non-volatile memory having at least one second key stored therein; and
for each first microprocessor, containing in a second non-volatile memory external to the second microprocessor the first keys of the first microprocessor encrypted with the second key, wherein, for each first microprocessor, the second non-volatile memory associated with the first microprocessor contains a table indexing the first keys of the first microprocessor and having a portion encrypted with the second key or with another second key stored in the first non-volatile memory, wherein the second microprocessor contains a volatile memory;
for each first microprocessor, asking, by the second microprocessor, the first microprocessor to transmit thereto the table stored in the second non-volatile memory associated with the first microprocessor;
decrypting, on reception of the table, the encrypted portion of the table by using the second key or said another second key; and
storing the decrypted portion of the table into the volatile memory.

9. The method according to claim 8, wherein, for each first microprocessor, the second microprocessor is coupled to the second non-volatile memory associated with the first microprocessor only via the first microprocessor.

10. The method according to claim 9, wherein, for each first microprocessor, the table stored in the second non-volatile memory associated with the first microprocessor contains a monotonic counter.

11. The method according to claim 10, comprising:
for each first microprocessor, asking, by the second microprocessor, the first microprocessor to transmit thereto the value of the monotonic counter of the table present in the second non-volatile memory associated with the first microprocessor; and
verifying the validity of the transmitted value of the monotonic counter.

12. The method according to claim 8, comprising:
for each first microprocessor, asking, by the second microprocessor, the first microprocessor to transmit thereto the first encrypted keys stored in the second non-volatile memory associated with the first microprocessor; and
decrypting the first transmitted keys.

13. The method according to claim 12, comprising:
determining, by the second microprocessor, for each first transmitted key, whether the first key can be stored into the volatile memory; and
storing the first decrypted key into the volatile memory in response to determining that the first key can be stored into the volatile memory.

14. The method according to claim 9, comprising:
for each first microprocessor, updating, by the second microprocessor, the table and one of the first keys of the first microprocessor;
encrypting the portion of the table and the first key by using the second key or said another second key; and
controlling the first microprocessor so that it stores into the second non-volatile memory associated with the first microprocessor the updated table and the updated first key.

15. A system, comprising:
a plurality of host microprocessors;
a secure microprocessor for securely managing first encryption keys of the host microprocessors, the secure microprocessor being configured to communicate with each of the host microprocessors and including a first non-volatile memory having at least one second key stored therein; and
a plurality of second non-volatile memories, each of the second non-volatile memories associated with a respective one of the plurality of host microprocessors and disposed external to the secure microprocessor, each of the second non-volatile memories containing the first encryption keys of the associated host microprocessor encrypted with the second key, wherein:
for each host microprocessor, the second non-volatile memory associated with the host microprocessor contains a table indexing the first encryption keys of the host microprocessor and having a portion encrypted with the second key or with another second key stored in the first non-volatile memory;
the secure microprocessor contains a volatile memory; and
for each host microprocessor, the secure microprocessor is configured to ask the host microprocessor to transmit thereto the table stored in the second non-volatile memory associated with the host microprocessor to, on reception of the table, decrypt the encrypted portion of the table by using the second key or the another second key, and to store the decrypted portion of the table into the volatile memory.

16. The system of claim 15, wherein the system is an onboard network of a motor vehicle.

\* \* \* \* \*

UNITED STATES PATENT AND TRADEMARK OFFICE
CERTIFICATE OF CORRECTION

PATENT NO. : 12,058,255 B2
APPLICATION NO. : 17/553481
DATED : August 6, 2024
INVENTOR(S) : Julien Couvrand et al.

It is certified that error appears in the above-identified patent and that said Letters Patent is hereby corrected as shown below:

On the Title Page

Item (73) Assignees:
"STMicroelectro cs (Rousset) SAS, Rousset (FR)"
Should read:
-- STMicroelectronics (Rousset) SAS, Rousset (FR) --.

Signed and Sealed this
Eighth Day of October, 2024

Katherine Kelly Vidal
*Director of the United States Patent and Trademark Office*